United States Patent [19]
Colburn

[11] Patent Number: 5,806,892
[45] Date of Patent: Sep. 15, 1998

[54] FUEL TANK MOUNT FOR FORKLIFT TRUCKS WITH A SWING ARM SWINGABLE ABOUT A TILTED PIVOT AXIS

[75] Inventor: Eric Richard Colburn, Wexford, Pa.

[73] Assignees: Daewoo Heavy Industries, Ltd., Incheon, Rep. of Korea; Daewoo Equipment Corporation, Warrensville Heights, Ohio

[21] Appl. No.: 763,281

[22] Filed: Dec. 10, 1996

[51] Int. Cl.$^6$ .................................................. B60P 3/22
[52] U.S. Cl. .......................................... 280/834; 224/401
[58] Field of Search .................................. 280/830, 834; 224/548, 549, 502, 509, 401

[56] References Cited

U.S. PATENT DOCUMENTS

| | | | |
|---|---|---|---|
| 4,025,080 | 5/1977 | Gedeon | 280/834 |
| 4,059,281 | 11/1977 | Evans | 280/834 |
| 4,770,428 | 9/1988 | Sugiyama | 280/834 |
| 5,634,665 | 6/1997 | Jung | 280/834 |

Primary Examiner—Kevin Hurley
Attorney, Agent, or Firm—Lowe Hauptman Gopstein Gilman & Berner

[57] ABSTRACT

A fuel tank mount for forklift trucks is adapted to hold a fuel tank over the top of a counterweight in a manner that the tank may be easily lifted up and lowered down. The fuel tank mount includes a swing arm replaceably carrying the fuel tank and mounted to the counterweight for swinging movement about a tilted pivot axis between a home position wherein the fuel tank is held over and laterally across the counterweight, a neutral position wherein the fuel tank remains at its highest elevation and a tank changing position wherein the fuel tank is oriented substantially vertically. The pivot axis remains tilted both forwards at a first tilt angle, e.g., 26 degrees, and outboards at a second tilt angle, e.g., 25 degrees, with respect to a vertical axis. A latch is provided to keep the swing arm in the home position against unwanted swinging movement into the neutral and the tank changing positions.

20 Claims, 9 Drawing Sheets

FUEL TANK MOUNT FOR FORKLIFT TRUCKS WITH A SWING ARM SWINGABLE ABOUT A TILTED PIVOT AXIS

FIELD OF THE INVENTION

The present invention is generally directed to liquid propane powered forklift trucks and, more specifically, to a fuel tank mount for the forklift trucks of the type having a tank carrying swing arm swingable about a tilted pivot axis between an upper home position and a lower tank changing position to thereby ease the task of loading and unloading the fuel tank.

DESCRIPTION OF THE PRIOR ART

As is generally known in the art, conventional forklift trucks include a vehicle frame, a mast attached to the front end of the vehicle frame, a fork carriage adapted for elevational movement along the mast to raise and lower loads and a counterweight located at the rear end of the vehicle frame for retaining balance of the forklift truck as heavyweight loads are lifted up and lowered down. Mounted substantially at the center of the vehicle frame is an engine which will be kept covered with a hood or bonnet. A driver's seat is fixedly secured to the hood and surrounded by an overhead guard which defines a cabin of the trucks. In case of a liquid propane powered forklift truck, it would be necessary to replaceably mount a fuel tank, e.g., liquid propane tank, over the counterweight in a manner that the fuel tank lies on its side and is tied up with a bander or clamp. At the time when the fuel tank runs dry, the bander is untied to permit replacement of the fuel tank with a full one.

There occur frequently such instances where the hood is opened for the operator to gain access to an engine room provided under the hood. The fuel tank held above the counterweight will at this time hinder the backward swing of the seat and thus heavily restrict the opening angle of the hood. In other words, the hood cannot be fully opened without removing the fuel tank prior to the backward opening of the hood. To assure that the hood be opened to its full opening angle, therefore, it is required to remove the fuel tank beforehand into a position wherein no physical interference may take place between the seat and the fuel tank.

As a solution to this problem, use has been made of a fold-back type fuel tank mount that enables a fuel tank to be moved rearwardly from its home position in advance of a hood being opened. The fold-back type fuel tank mount includes a base plate attached to a counterweight of the forklift truck, a swingable cradle lying above the base plate and having a bander with which the fuel tank may be tied up, a hinge for coupling the swingable cradle to the base plate and a latch adapted to retain the swingable cradle against any unwanted swinging movement with respect to the base plate. In operation, pulling backward the fuel tank with the latch released will cause the swingable cradle to turn rearwardly about a horizontal hinge axis so that the fuel tank is removed out of the home position to permit full opening of the hood.

Due mainly to the heavyweight nature of the fuel tank, the fold-back type fuel tank mount stated above tends to pose a drawback in that, in the process of swinging the cradle together with the fuel tank, a significant magnitude of mechanical shock may occur with the result that parts or components are subjected to deformation and even breakage. An attempt has been made to avoid such drawback in U.S. patent application Ser. No. 08/520,587, which discloses a sliding type fuel tank mount including a fixed plate attached to the counterweight of a forklift truck and a movable plate supporting the fuel tank thereon and adapted for backward sliding movement with respect to the fixed plate to leave a room for accommodation of a seat-carrying hood when the latter is to be opened.

With the prior art fuel tank mounts as referred to hereinabove, as the fuel tank runs dry, it is usually the responsibility of the operator to replace the empty tank with a full one. This requires six steps: (i) Disconnect a feed hose leading from the tank to an engine; (ii) Unclamp the empty tank from its cradle; (iii) Lift and remove the empty tank; (iv) Lift a new tank and place it in the cradle; (v) Clamp the new tank in place; and (vi) Connect the feed hose to the new tank.

The tank replacing procedure entails a difficult and potentially dangerous task. The main difficulty with this procedure lies in steps (iii) and (iv) wherein the operator must lift the fuel tank from the ground to a height of 120 cm or more. Empty liquid propane tanks normally weigh between 8.5 and 22 kg, full tanks weighing about 17.5 to 41 kg. With the fuel tank held at chest level or higher, the operator has to extend the tank over the counterweight to drop it into the cradle, in which process the risk of injury to the operator is significant. Some operators consider heaving the tank onto the truck to be a "macho" part of the job. But with more women drivers being hired and the tightening of union rules and government safety regulations, there is a need for an improved fuel tank mount that ease the task of loading and unloading fuel tanks.

SUMMARY OF THE INVENTION

Accordingly, it is an object of the invention to provide a fuel tank mount for forklift trucks that can significantly reduce the force needed to lift a fuel tank and positively guide the fuel tank in the lift process, thus easing the task of loading and unloading the fuel tank.

With this object in mind, the present invention provides a fuel tank mount for forklift trucks adapted to hold a fuel tank in place, comprising: a counterweight; a base plate fixedly secured to and extending laterally across the top of the counterweight, the base plate having a tilted pivot pin projecting upwards from one lateral end of the plate; and a swing arm replaceably carrying the fuel tank and pivotally mounted to the pivot pin for rotation between a home position wherein the tank is held above and laterally across the counterweight, a neutral position wherein the tank remains at its highest elevation and a tank changing position wherein the tank lies alongside the counterweight. One of the key innovative features lies in that the pivot pin is tilted both forwards at a first tilt angle and outboards at a second tilt angle, enabling the swing arm to describe a tilted arc while moving from the home position to the tank changing position.

BRIEF DESCRIPTION OF THE DRAWINGS

The above and other objects, features, advantages of the invention will become apparent from a review of the following detailed description of the preferred embodiment taken in conjunction with the accompanying drawings, in which.

DETAILED DESCRIPTION OF THE PREFERRED EMBODIMENT

Figure 1:
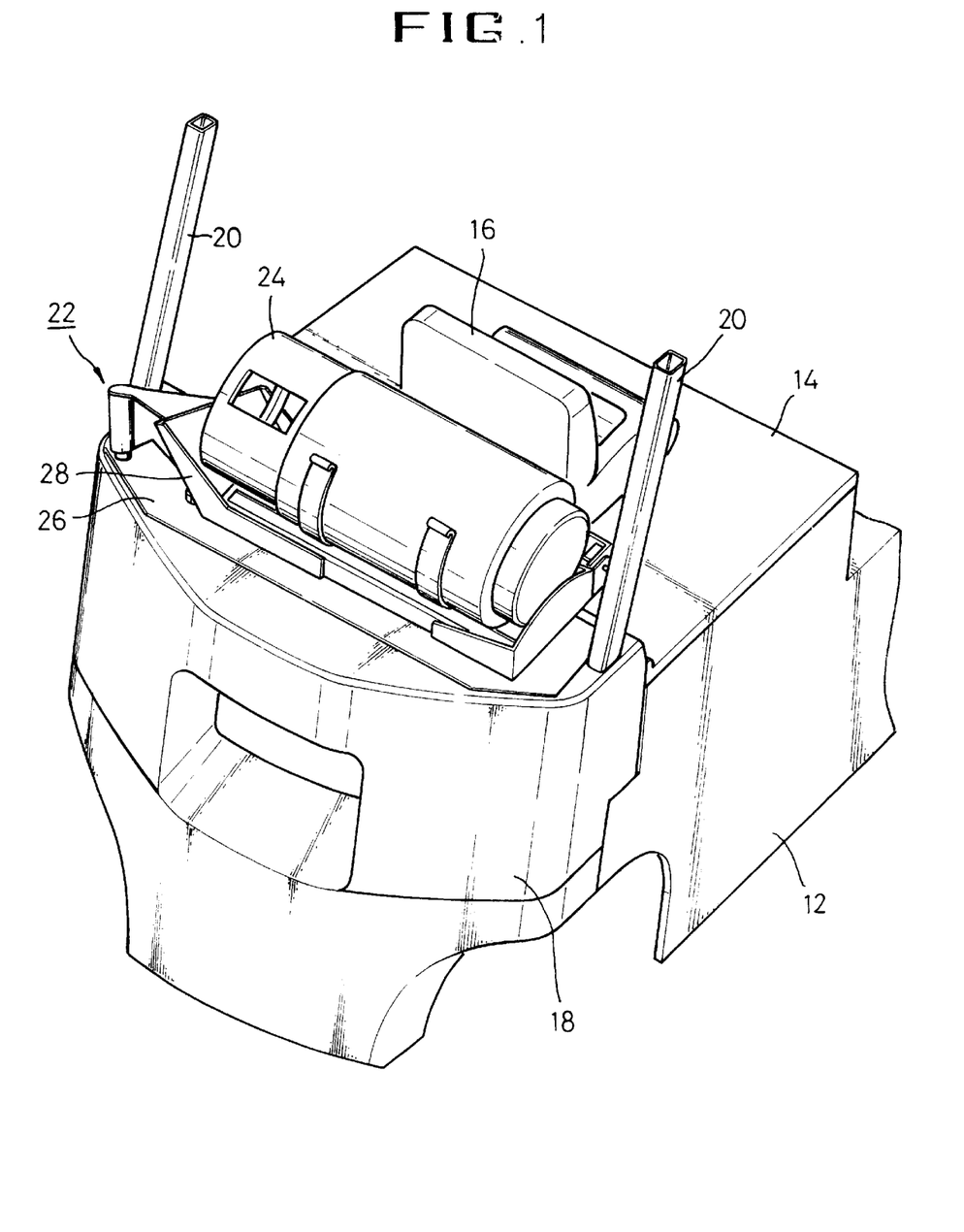
FIG. 1 is a perspective view showing a forklift truck carrying a fuel tank mount in accordance with the invention, with portions of the truck removed for simplification.

Referring first to FIG. 1, it will be noted that a typical liquid propane powered forklift truck is shown schematically with portions thereof removed for the sake of simplified illustration. As shown, the forklift truck includes among other things a vehicle frame 12 and a hood 14 hinged to the vehicle frame 12 such that it can be opened backwards to provide access to an engine room at the center of the vehicle frame 12. The hood 14 is designed to carry an operator's seat 16 on the top thereof which would be swung backwards together with the hood 14 as the latter is opened by the operator. Mounted at the rear of the vehicle frame 12 is a counterweight 18 which has a generally flat top and opposite flank sides. Overhead guard beams 20 extend upwards from the top of the counterweight 18 at opposite lateral edges thereof.

In the embodiment illustrated in FIG. 1, the fuel tank mount 22 in accordance with the instant invention includes the counterweight 18 in its broad meaning and is adapted to replaceably hold a fuel tank 24, e.g., liquid propane tank, in between the overhead guard beams 20. The inventive fuel tank mount 22 further includes a base plate 26 fixedly secured to the top of the counterweight 18 with suitable fastener means and a tank carrying swing arm 28 swingably supported on the base plate 26. As will be set forth later in detail, the fuel tank mount 22 is of such geometry as to assist the operator by reducing the force needed to lift the fuel tank 24 and by guiding the fuel tank 24 during the substantially full process of the lift. Moreover, the fuel tank mount 22 may be used to allow the fuel tank 24 to be swung out from the counterweight 18 to provide room for the seat to pivot through between the overhead guard beams 20 and over the counterweight 18 when the hood 14 is opened.

Figure 2:
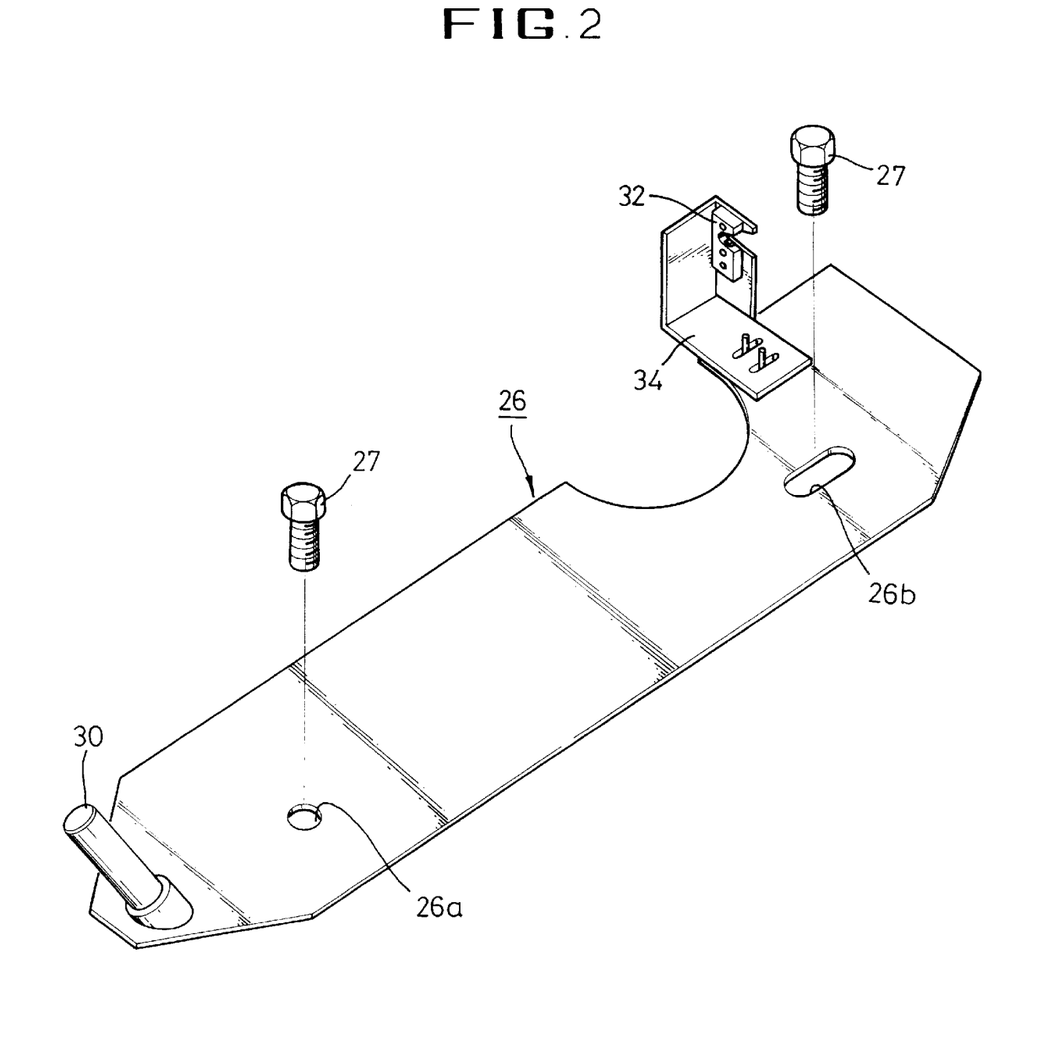
FIG. 2 is a perspective view illustrating a base plate having a pivot pin at one lateral end and a latch at the other end.
Figure 4:
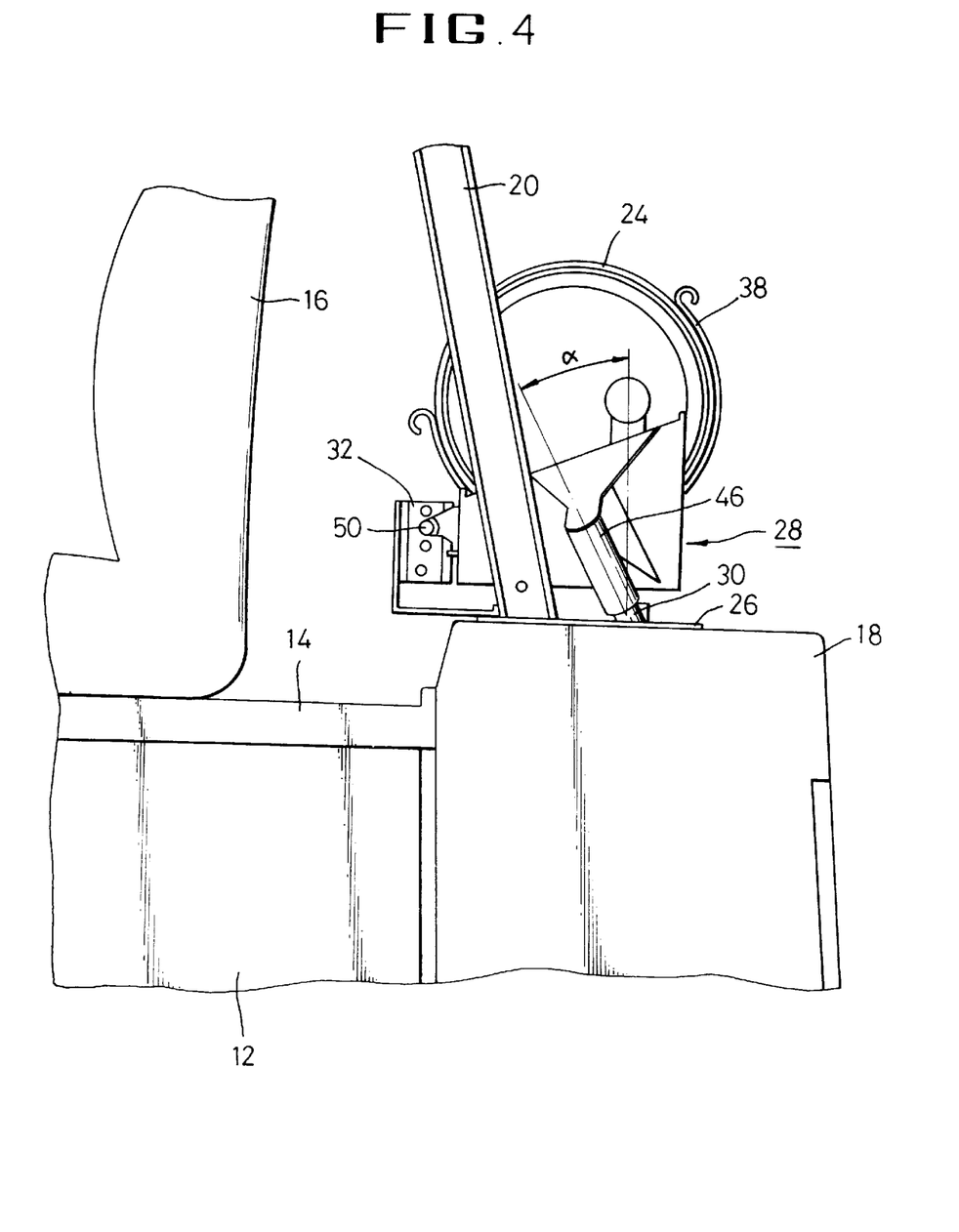
FIG. 4 is a side elevational view of the fuel tank mount attached at the rear of the forklift truck, best illustrating the forward tilt angle of a pivot axis.
Figure 5:
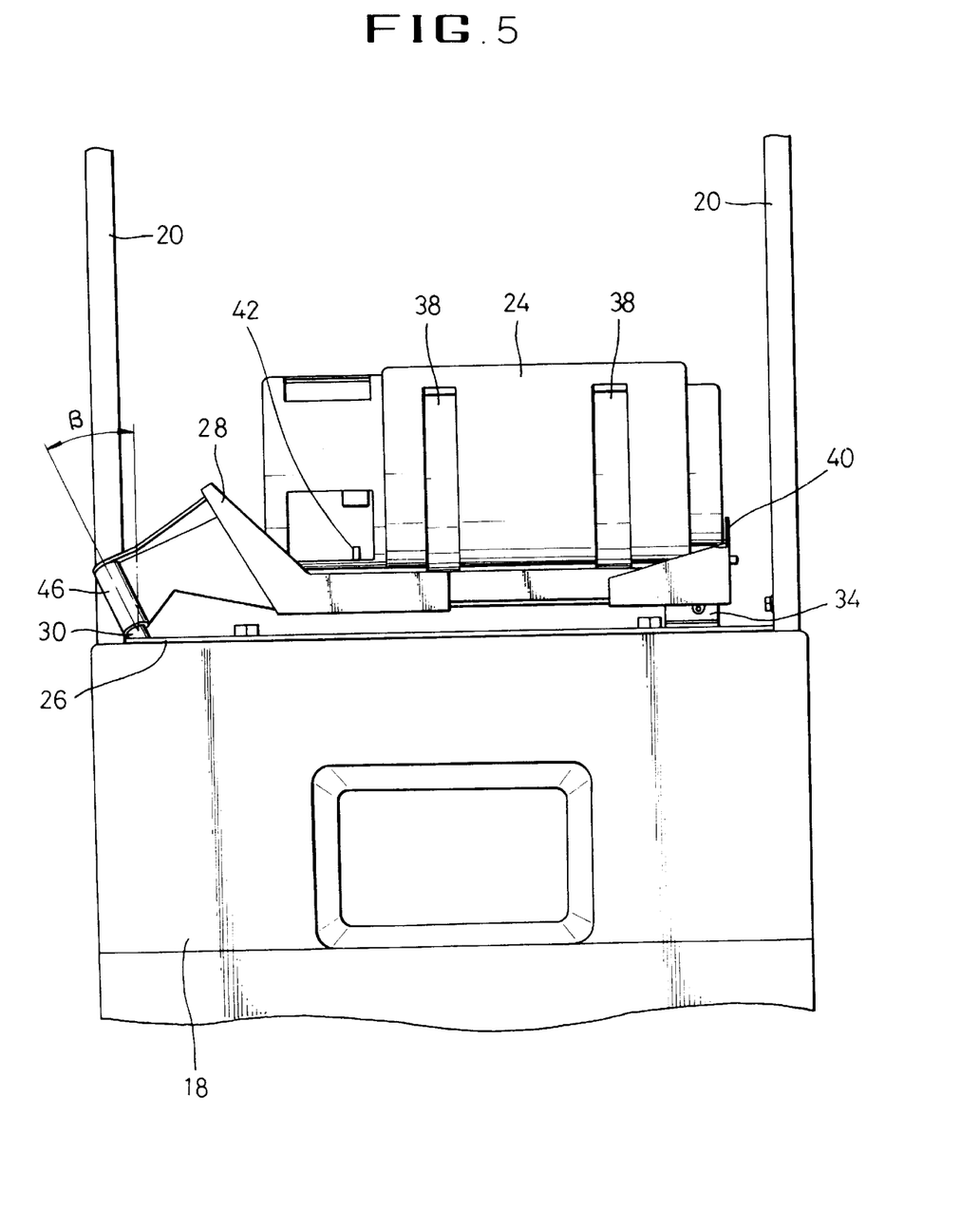
FIG. 5 is a rear elevational view of the forklift truck carrying the fuel tank mount, best showing the outboard tilt angle of the pivot axis.

As best shown in FIG. 2, the base plate 26 has a through-hole 26a and a slot 26b through which bolts 27 may pass and then threadedly affixed to the counterweight 18 to hold the base plate 26 in place. Projecting upwards at one end of the base plate 26 is a pivot pin 30 whose axis is tilted both forwards and outboards with respect to a vertical axis. The forward tilt angle α of the pivot pin 30 should preferably be about 26 degrees as clearly indicated in FIG. 4, while the outboard tilt angle β thereof should preferably be about 25 degrees as seen in FIG. 5. A latch 32 is attached to the other end of the base plate 26 by virtue of a latch bracket 34. While the base plate 26 is necessary for retrofitting the existing trucks, namely, for attaching the pivot pin 30 and the latch 32 to the counterweight of the existing trucks, it is envisioned that new trucks may eliminate this need by incorporating a pivot pin and a latch in their counterweight or roll cage. This means that attaching the pivot pin 30 and the latch 32 directly to the counterweight 18 with no base plate should fall within the scope of the invention as defined in the claims.

Figure 3:
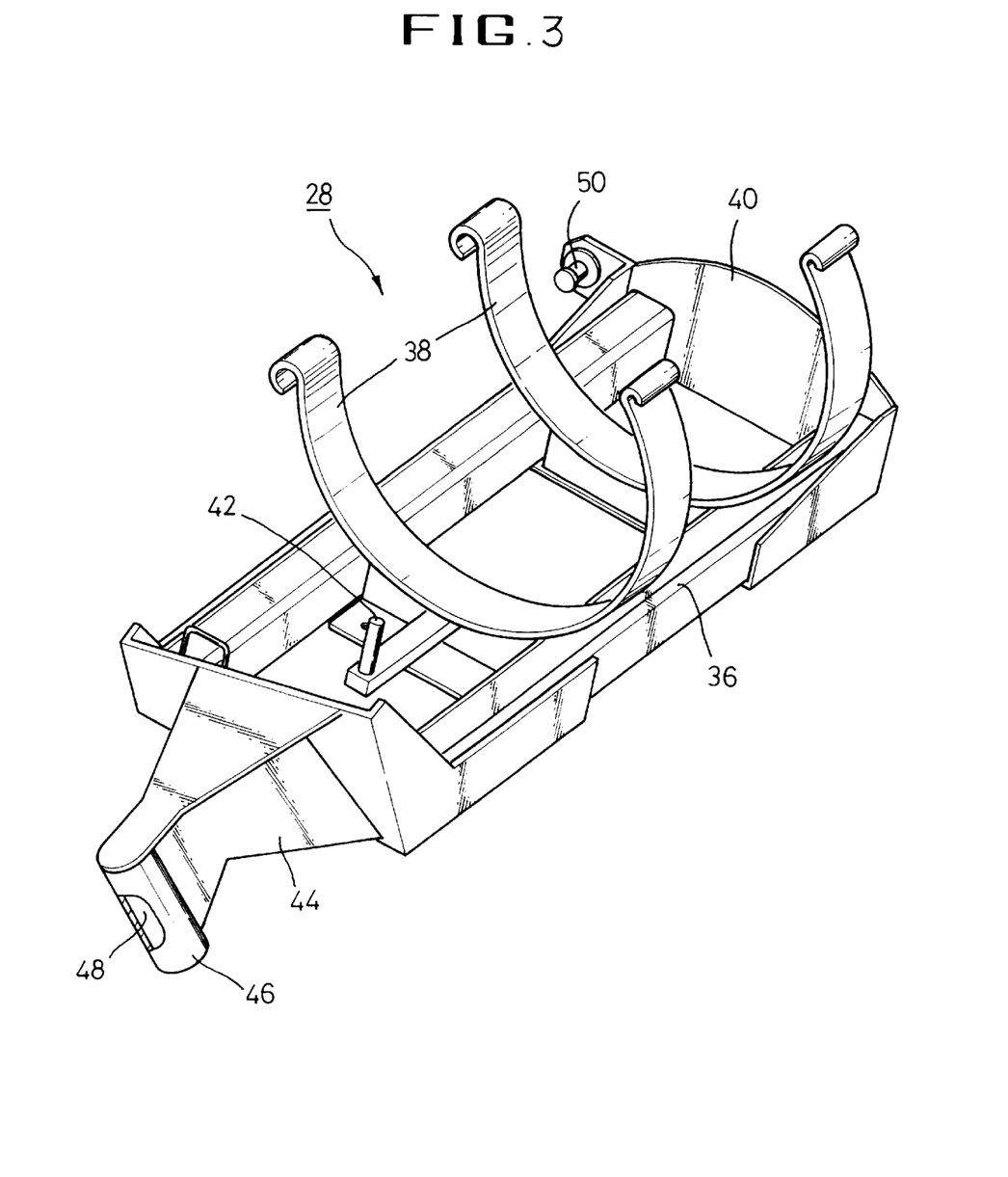
FIG. 3 is a perspective view showing a swing arm pivotably fitted to the pivot pin for swinging movement along a tilted arc.

Turning to FIG. 3, it can be appreciated that the swing arm 28 is provided with a cradle 36 in which the fuel tank 24 lies on its side. The cradle 36 has a clamp set 38 utilized to tie up the fuel thank 24 in a replaceable manner, a ledge 40 allowing the fuel tank 24 to rest against it when the fuel tank 24 is initially placed in the cradle 36, and a locator pin 42 coming into engagement with a positioning hole(not shown) of the fuel tank 24 to enable the fuel tank 24 to be located in an exact position of the cradle 36. Attached to one end of the cradle 36 through a neck member 44 is a pivot socket 46 having a blind bore 48 that may receive the pivot pin 30 of the base plate 26. The orientation of the pivot socket 46 with respect to the cradle 36 is such that, when the swing arm 28 remains just above the counterweight 18, the plane of the cradle 36 is in parallel with the flat top of the counterweight 18. Affixed to the other end of the swing arm 28 is a striker 50 which may releasably engage the latch 32 of the base plate 26 to retain the swing arm 28 and hence the fuel tank 24 in place during the operation of the truck.

Figure 6:
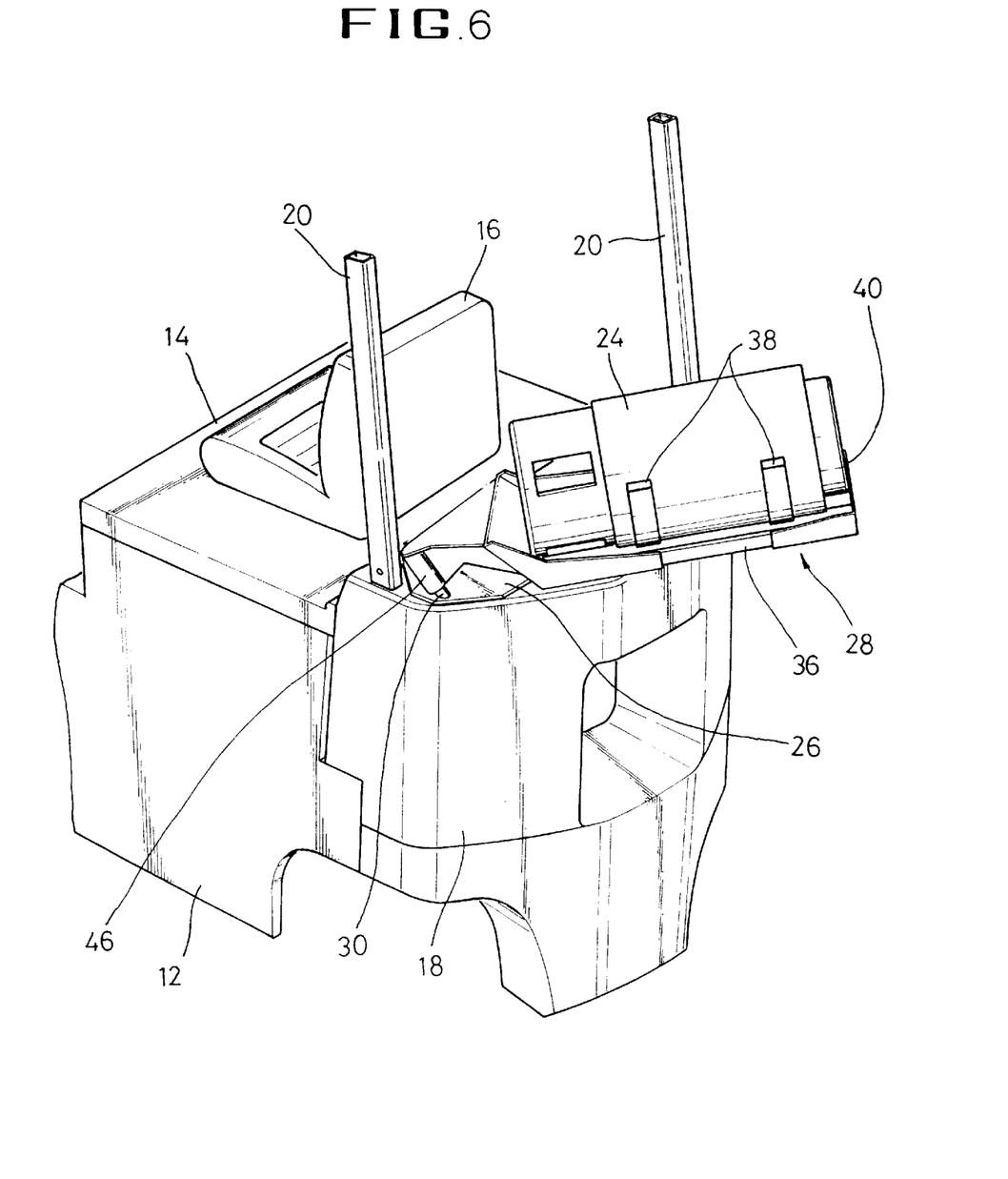
FIG. 6 depicts the swing arm moved 50 degrees off the home position shown in FIG. 1 into a neutral position wherein the fuel tank is at the highest elevation.

The swinging movement of the swing arm 28 will be described in greater detail with particular reference to FIGS. 6 through 9. The swing arm 28 may be swung about the tilted pivot pin 30 away from the top of the counterweight 18 toward the side thereof in a manner that the path the fuel tank 24 travels can describe a tilted arc. During the normal operation of the forklift truck, the swing arm 28 is kept in a home position, as shown in FIG. 1, wherein the fuel tank is held above and laterally across the counterweight 18. When the swing arm 28 is unlatched and rotated away from the home position to the left, it moves slightly up over the rear of the counterweight 18 into a neutral position which is about 50 degrees off the home position, as shown in FIG. 6. In the neutral position, the swing arm 28 and the fuel tank 24 are at its highest elevation, i.e., at the top of the tilted arc, and there are no forces tending to move them leftwardly or rightwardly.

Figure 7:
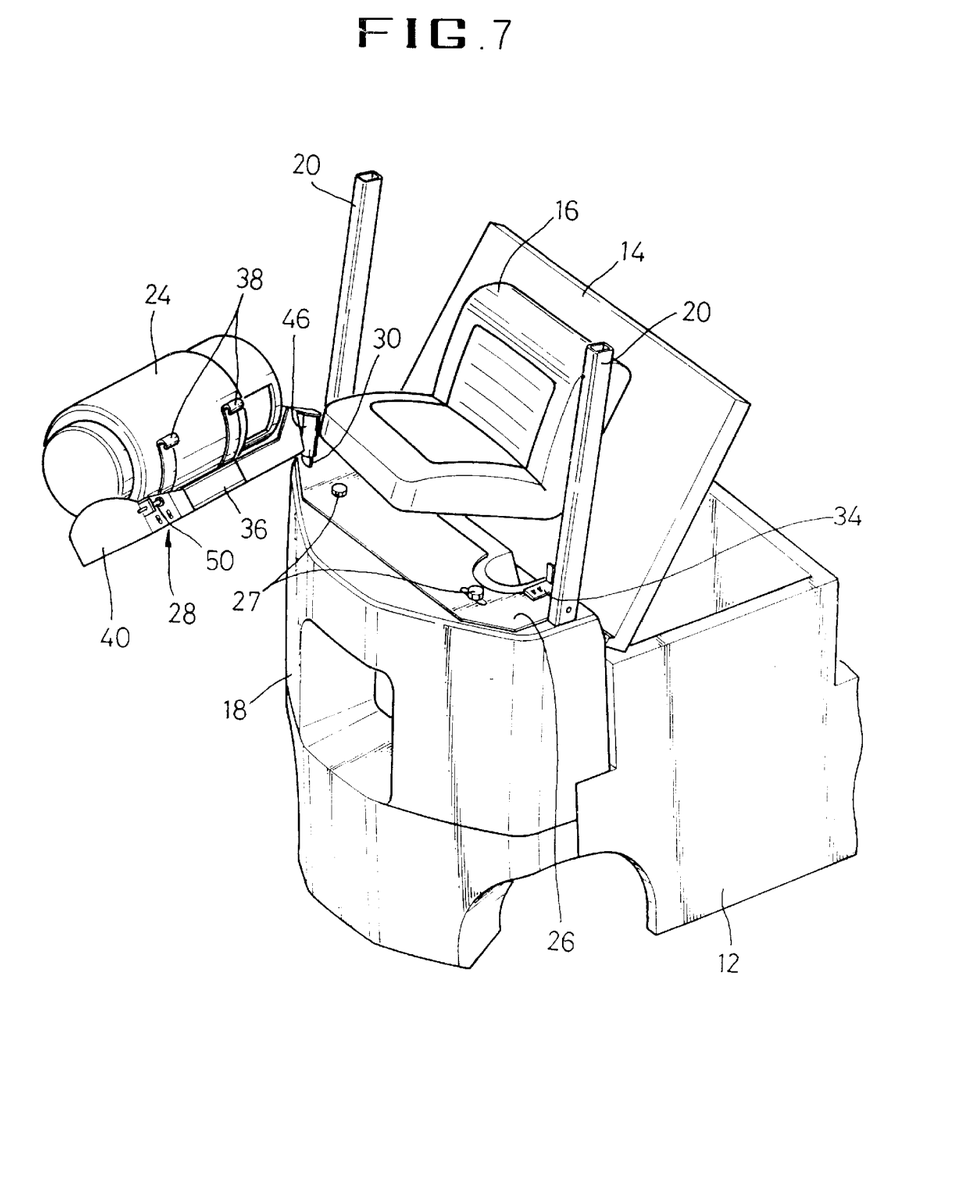
FIG. 7 represents the swing arm further swung from the neutral position into a 75° position, with the hood opened for engine maintenance.

Further rotation of the swing arm 28 to the left will cause it to move slightly down along the tilted arc into a temporary locking position which is about 75 degrees off the home position, as shown in FIG. 7. In this position, there are weak forces tending to move the swing arm 28 leftwardly. By engaging a detent (not shown) at this point, the swing arm 28 can be locked in place some distance off the counterweight 18. This provides room for the operator's seat 16 to swing up over the counterweight 18 when the hood 14 is opened. Alternative or additional detents or other locking means can be incorporated in the fuel tank mount 22 to permit the swing arm 28 to be locked in any arbitrary position. If desired, the swing arm 28 may be locked in the neutral position rather than the temporary locking position.

Figure 8:
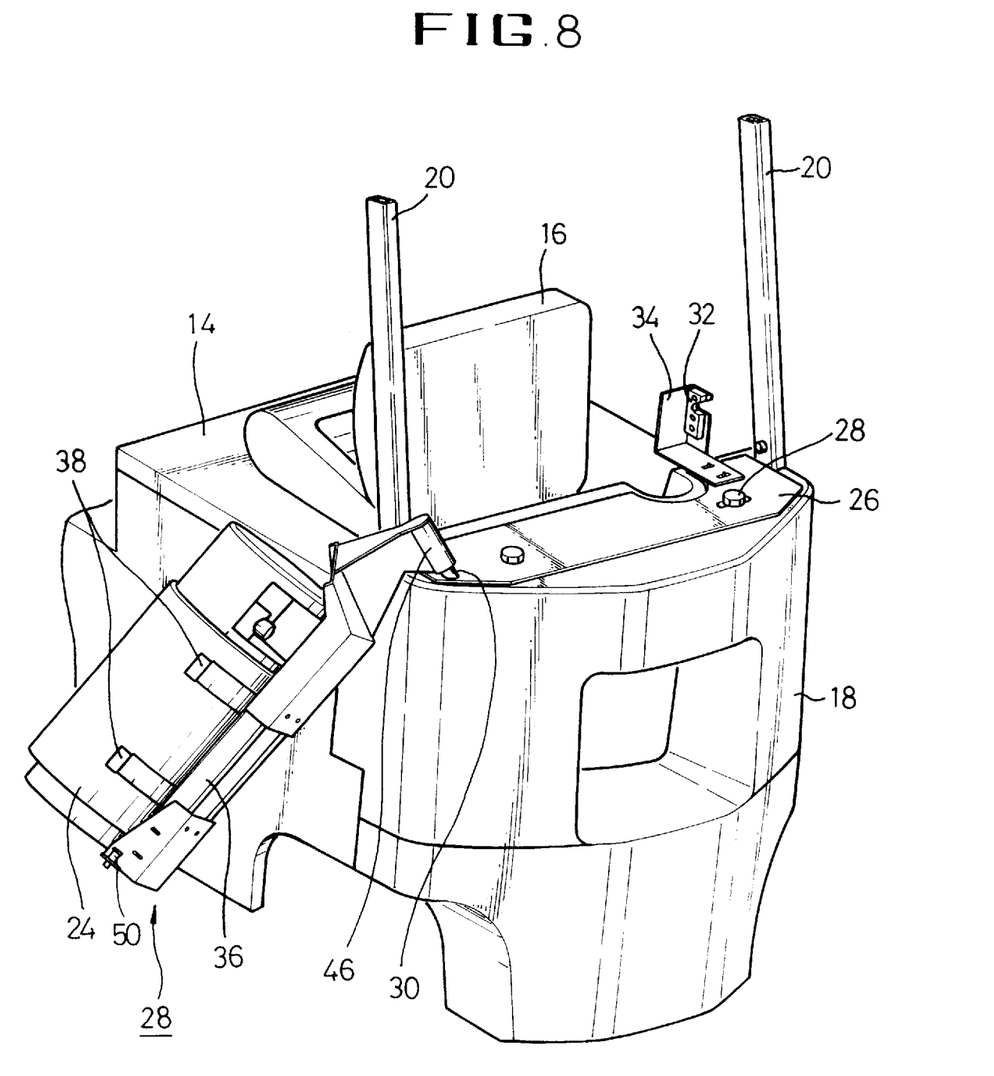
FIG. 8 illustrates the swing arm swung 215 degrees off the home position into a tank changing position wherein the fuel tank is oriented substantially vertically alongside the counterweight.

At the terminus of the down-swing movement of the swing arm 28, it reaches a tank changing position which is about 215 degrees off the home position, as depicted in FIG. 8. With the swing arm 28 alongside the counterweight 18 in this position, the fuel tank 24 is oriented nearly vertically to assist the operator in loading and unloading the fuel tank 24 into and out of the cradle 36 of the swing arm 28. This is important since typically fuel tanks are stored vertically and brought to the forklift truck by dragging or carrying the tanks with the use of handles built to its top. The vertical orientation means that to load the fuel tank 24 the operator only has to lift the tank 24 about 50 cm off the floor, rest it on the ledge 40 of the cradle 36 and tip it into the clamp set 38. The clamp set 38 can then be tightened and the feed hose (not shown) leading to an engine is connected to the fuel tank 24 while the latter is easily accessible. When the tank 24 is tightened in the cradle 36, the swing arm 28 can be swung up into the home position over the top of the counterweight 18 and latched in place.

As fully set forth above, since the swing arm 28 in the instant fuel tank mount 22 is pivotally attached to the tilted pivot pin 30, it can move slightly up over the rear of the counterweight and then down to the side of the forklift truck along a tilted arc which begins at the home position and ends at the tank changing position. This provides a mechanical advantage essentially equivalent to a ramp, thus easing the task of loading and unloading the fuel tank 24.

Figure 9:
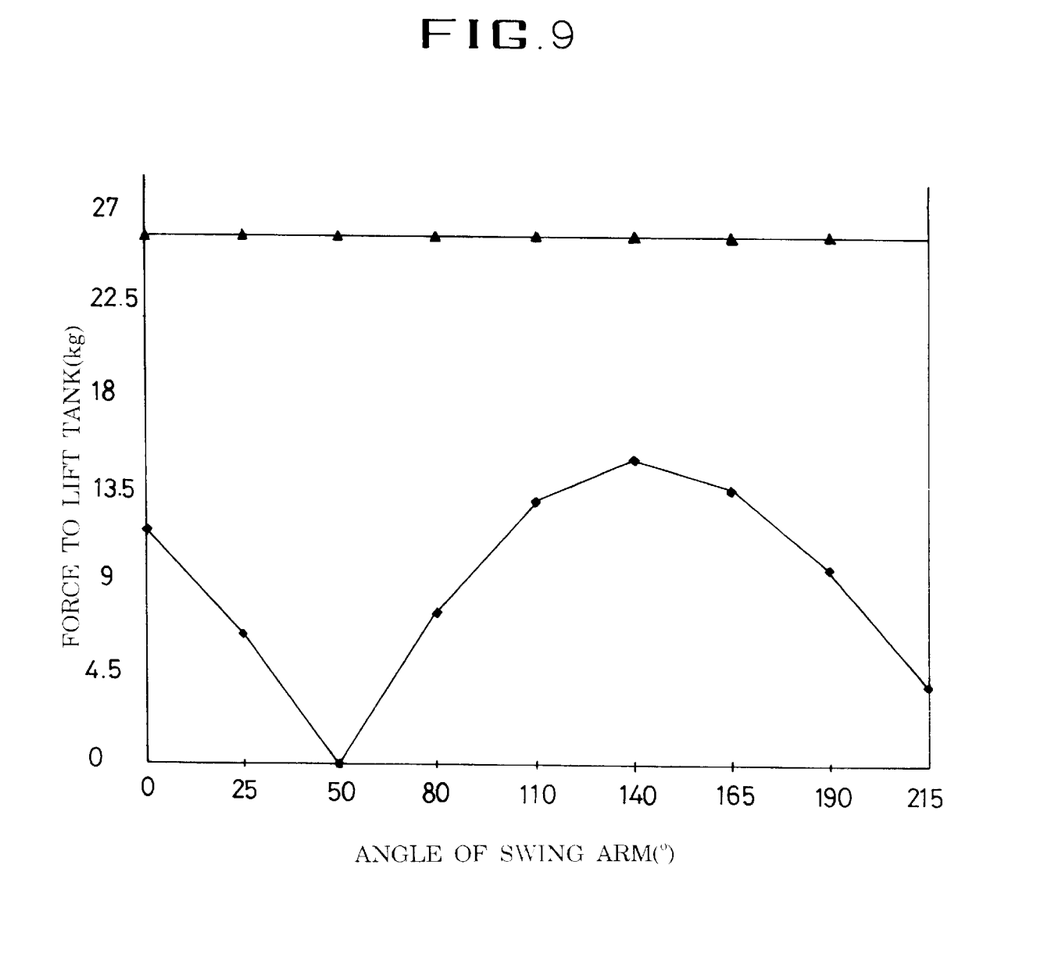
FIG. 9 is a graphical representation plotting the lift forces against the swing angle, with the diamond dot curve representing the lift force needed in the fuel tank mount with a swing arm and the triangle dot curve without the swing arm.

While the exact geometry will vary for different size trucks, the typical swing arm of the invention helps reduce the peak force the operator sees in the lifting process approximately by one half or more. The reduction of the forces needed to lift the fuel tank 24 is graphically illustrated in FIG. 9 wherein the diamond dot line represents the lift force variation in the inventive fuel tank mount, the triangle dot line showing the lift force in the conventional fuel tank mount without the swing arm. The angle of swing arm in FIG. 9 is measured from the home position from which the arm begins to swing toward the tank changing position.

While the invention has been shown and described with reference to a preferred embodiment, it should be apparent to one of ordinary skill that many changes and modifications may be made without departing from the spirit and scope of the invention as defined in the claims.

What is claimed is:

1. A fuel tank mount for forklift trucks adapted to hold a fuel tank in place, comprising: a counterweight; and a swing arm replaceably carrying the fuel tank and pivotally mounted to the counterweight for rotation about a tilted pivot axis from the top of the counterweight to the lateral side thereof.

2. The fuel tank mount for forklift trucks as recited in claim 1, wherein the swing arm has a home position wherein the tank is held above and laterally across the counterweight and a tank changing position wherein the tank lies alongside the counterweight.

3. The fuel tank mount for forklift trucks as recited in claim 2, wherein the swing arm further has a neutral position wherein the tank remains at its highest elevation.

4. The fuel tank mount for forklift trucks as recited in claim 1, wherein the pivot axis is tilted both forwards at a first tilt angle and outboards at a second tilt angle with respect to a vertical axis.

5. The fuel tank mount for forklift trucks as recited in claim 4, wherein the first tilt angle is about 26 degrees and the second tilt angle is about 25 degrees.

6. The fuel tank mount for forklift trucks as recited in claim 3, further comprising a base plate fixedly secured to and extending laterally across the top of the counterweight, the base plate having a pivot pin projecting upwards from one lateral end of the plate to pivotally support the swing arm, the pivot pin tilted both forwards at a first tilt angle and outboards at a second tilt angle with respect to a vertical axis.

7. The fuel tank mount for forklift trucks as recited in claim 6, wherein the first tilt angle is about 26 degrees and the second tilt angle is about 25 degrees.

8. The fuel tank mount for forklift trucks as recited in claim 6, wherein the swing arm is provided with a cradle for holding the fuel tank on its side and a pivot socket attached to one side of the cradle and having a bore for receiving the pivot pin of the base plate.

9. The fuel tank mount for forklift trucks as recited in claim 8, wherein the cradle has a locator pin adapted to help locate the fuel tank in an intended position of the cradle.

10. The fuel tank mount for forklift trucks as recited in claim 6, further comprising means for latching the swing arm in the home position.

11. The fuel tank mount for forklift trucks as recited in claim 10, wherein the latching means comprises a latch affixed to the other lateral end of the base plate and a striker secured to the swing arm for engagement with the latch when the swing arm is in the home position.

12. A fuel tank mount for forklift trucks adapted to hold a fuel tank in place, comprising:
    a counterweight;
    a base plate fixedly secured to and extending laterally across the top of the counterweight, the base plate having a tilted pivot pin projecting upwards from one lateral end of the plate; and
    a swing arm replaceably carrying the fuel tank and pivotally mounted to the pivot pin for rotation from the top of the counterweight to the lateral side thereof along a tilted arc.

13. The fuel tank mount for forklift trucks as recited in a claim 12, wherein the swing arm has a home position wherein the tank is held above and laterally across the counterweight and a tank changing position wherein the tank lies alongside the counterweight.

14. The fuel tank mount for forklift trucks as recited in claim 13, wherein the swing arm further has a neutral position wherein the tank remains at its highest elevation.

15. The fuel tank mount for forklift trucks as recited in claim 12, wherein the pivot pin is tilted both forwards at a first tilt angle and outboards at a second tilt angle with respect to a vertical axis.

16. The fuel tank mount for forklift trucks as recited in claim 15, wherein the first tilt angle is about 26 degrees and the second tilt angle is about 25 degrees.

17. The fuel tank mount for forklift trucks as recited in claim 12, wherein the swing arm is provided with a cradle for holding the fuel tank on its side and a pivot socket attached to one side of the cradle and having a bore for receiving the pivot pin of the base plate.

18. A fuel tank mount for forklift trucks adapted to hold a fuel tank in place, comprising:
    a counterweight;
    a base plate fixedly secured to and extending laterally across the top of the counterweight, the base plate having a tilted pivot pin projecting upwards from one lateral end of the plate; and
    a swing arm replaceably carrying the fuel tank and pivotally mounted to the pivot pin for rotation between a home position wherein the tank is held above and laterally across the counterweight, a neutral position wherein the tank remains at its highest elevation and a tank changing position wherein the tank lies alongside the counterweight.

19. The fuel tank mount for forklift trucks as recited in claim 18, wherein the pivot axis is tilted both forwards at a first tilt angle and outboards at a second tilt angle with respect to a vertical axis.

20. The fuel tank mount for forklift trucks as recited in claim 19, wherein the first tilt angle is about 26 degrees and the second tilt angle is about 25 degrees.

* * * * *